July 3, 1951
S. M. ABBOTT
2,559,270
MEAT TENDERING MACHINE
Filed March 31, 1947
7 Sheets-Sheet 4
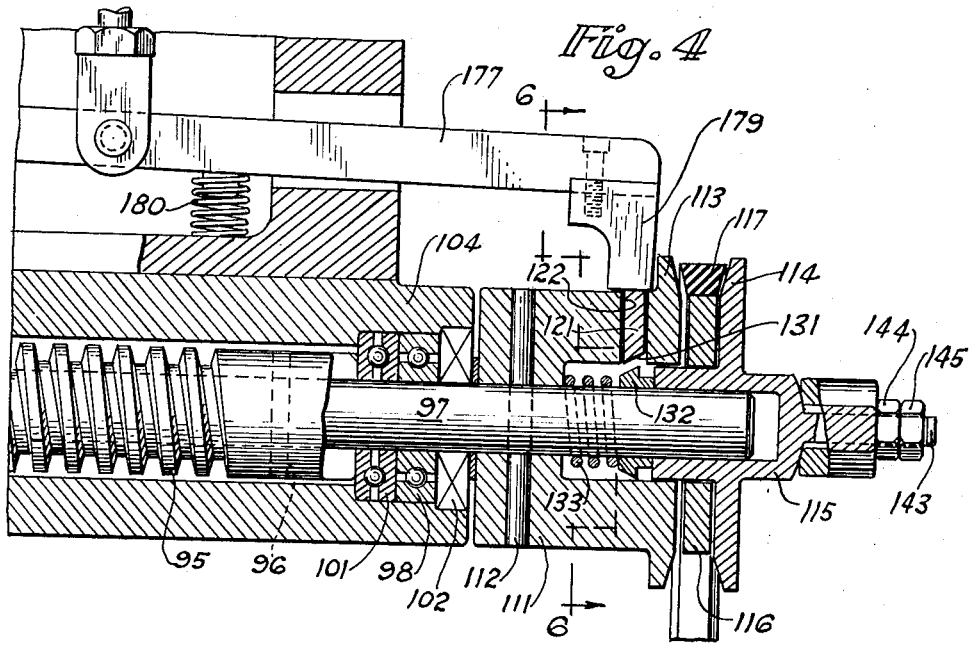
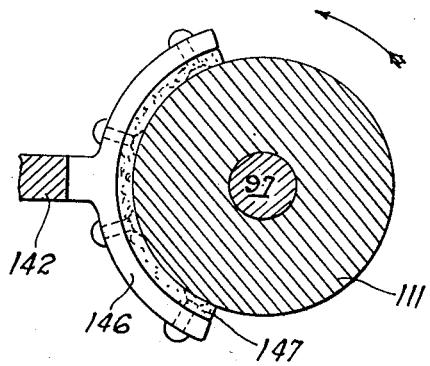
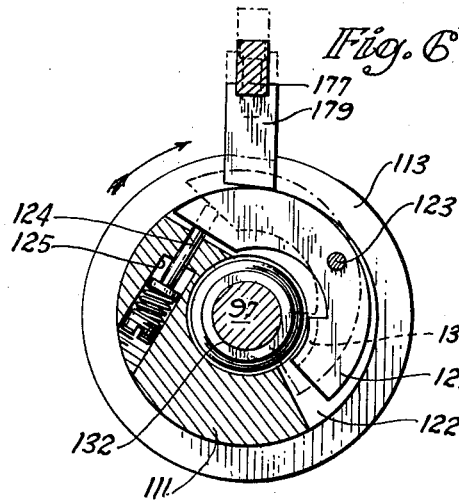
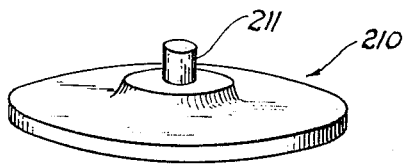
INVENTOR.
Scott M. Abbott
BY
Thiess Olsen & Mecklenburger
Attys July 3, 1951  S. M. ABBOTT  2,559,270
MEAT TENDERING MACHINE
Filed March 31, 1947  7 Sheets-Sheet 5
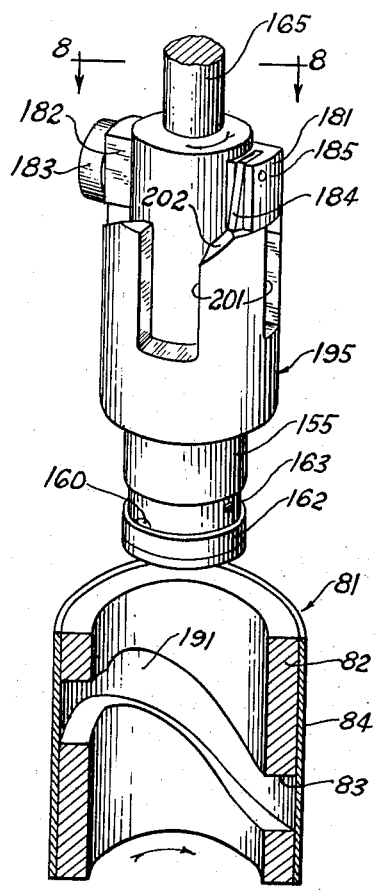
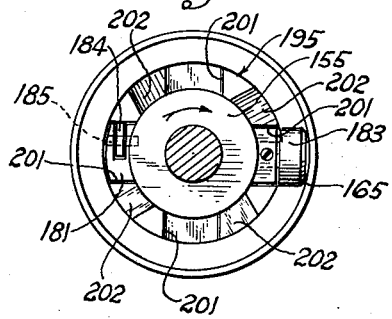
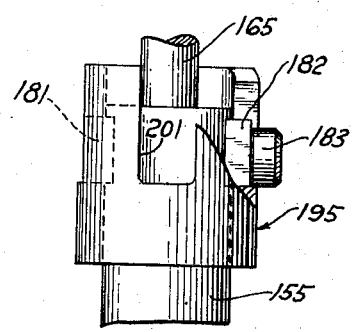
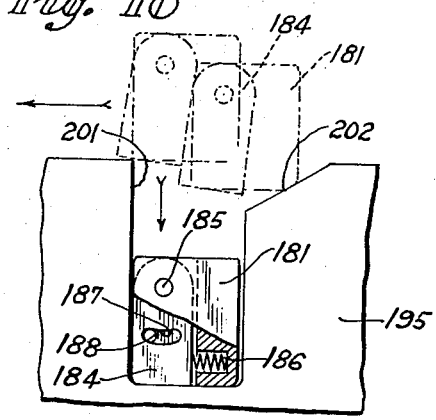
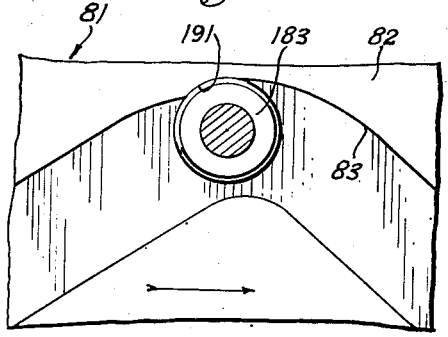
INVENTOR.
Scott M. Abbott
BY
Thiess Olson & Mecklenburger
Attys July 3, 1951 S. M. ABBOTT 2,559,270
MEAT TENDERING MACHINE
Filed March 31, 1947 7 Sheets-Sheet 6
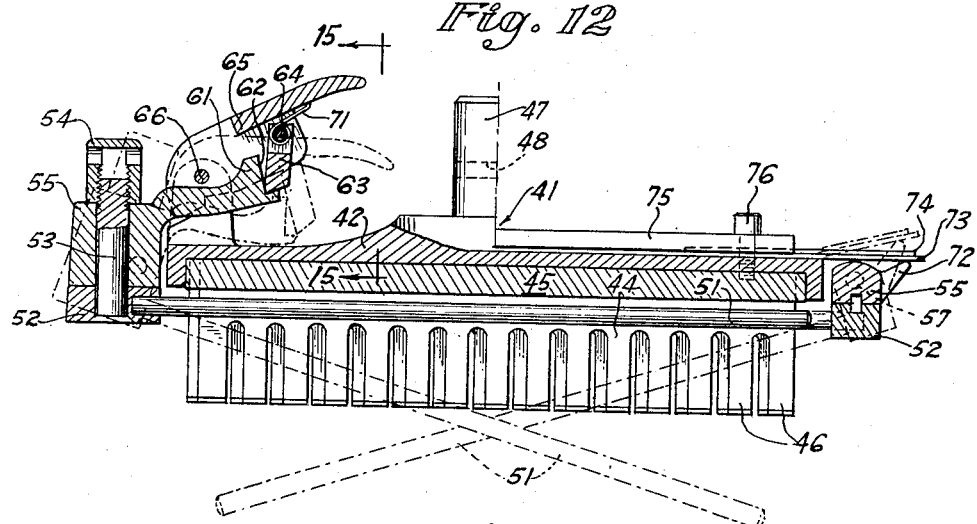
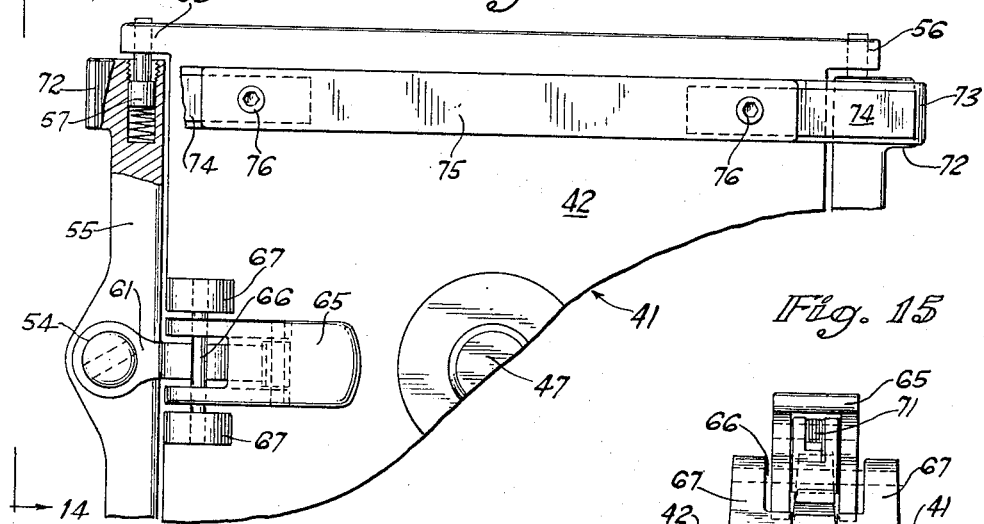
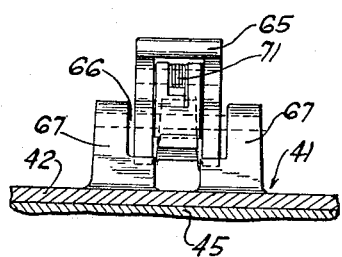
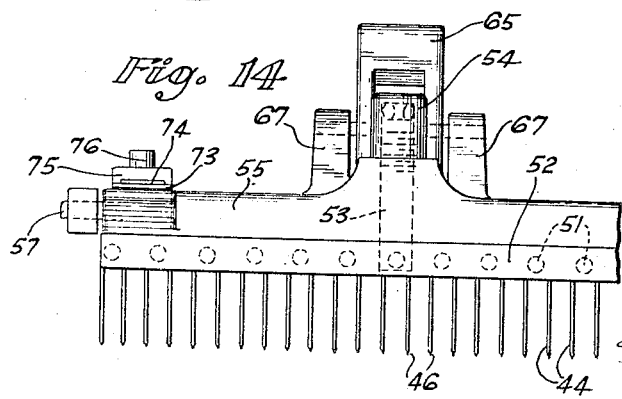
INVENTOR.
Scott M. Abbott
BY Theiss Olson & Mecklenburger
Attys July 3, 1951     S. M. ABBOTT     2,559,270
MEAT TENDERING MACHINE Filed March 31, 1947     7 Sheets-Sheet 7

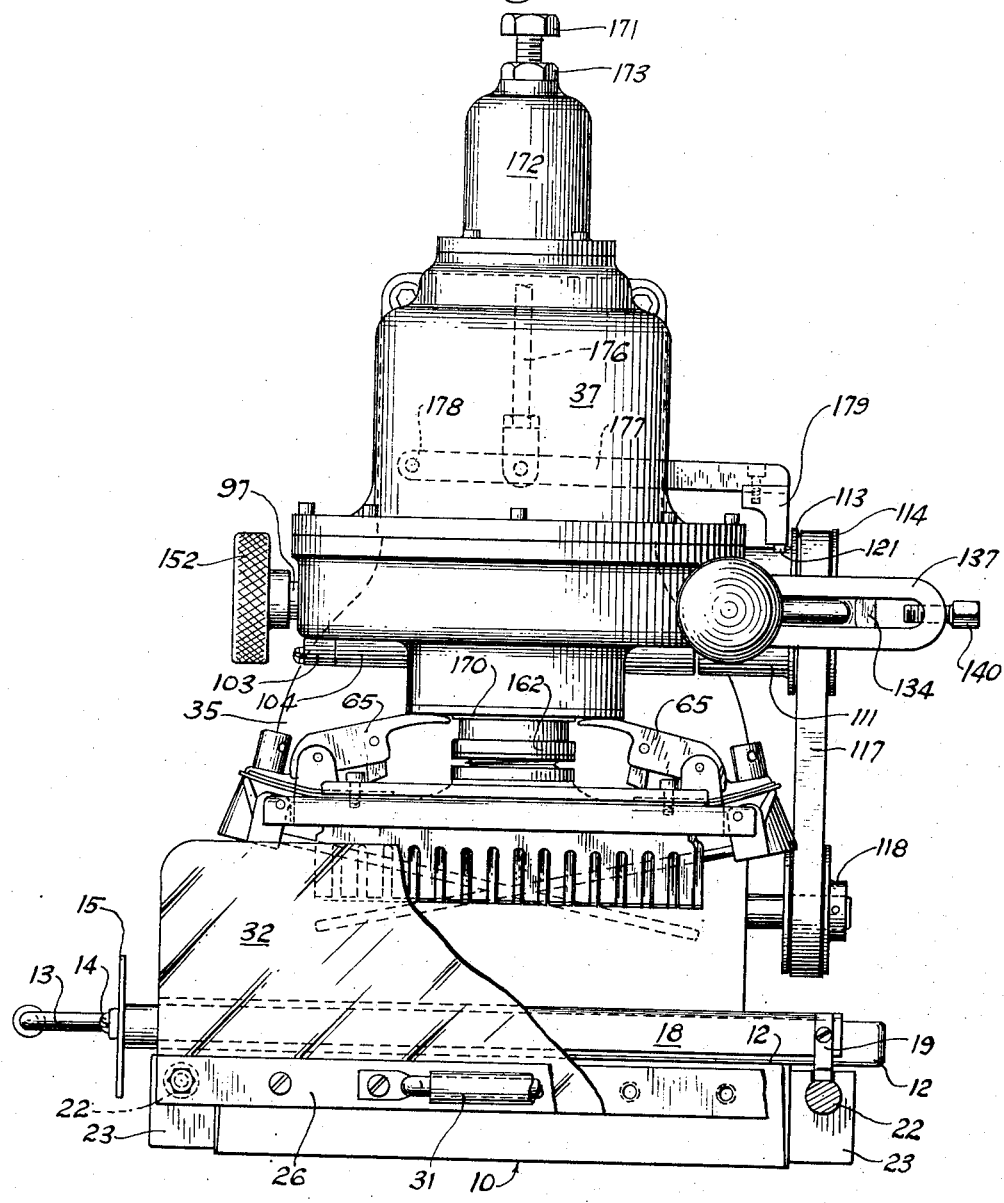

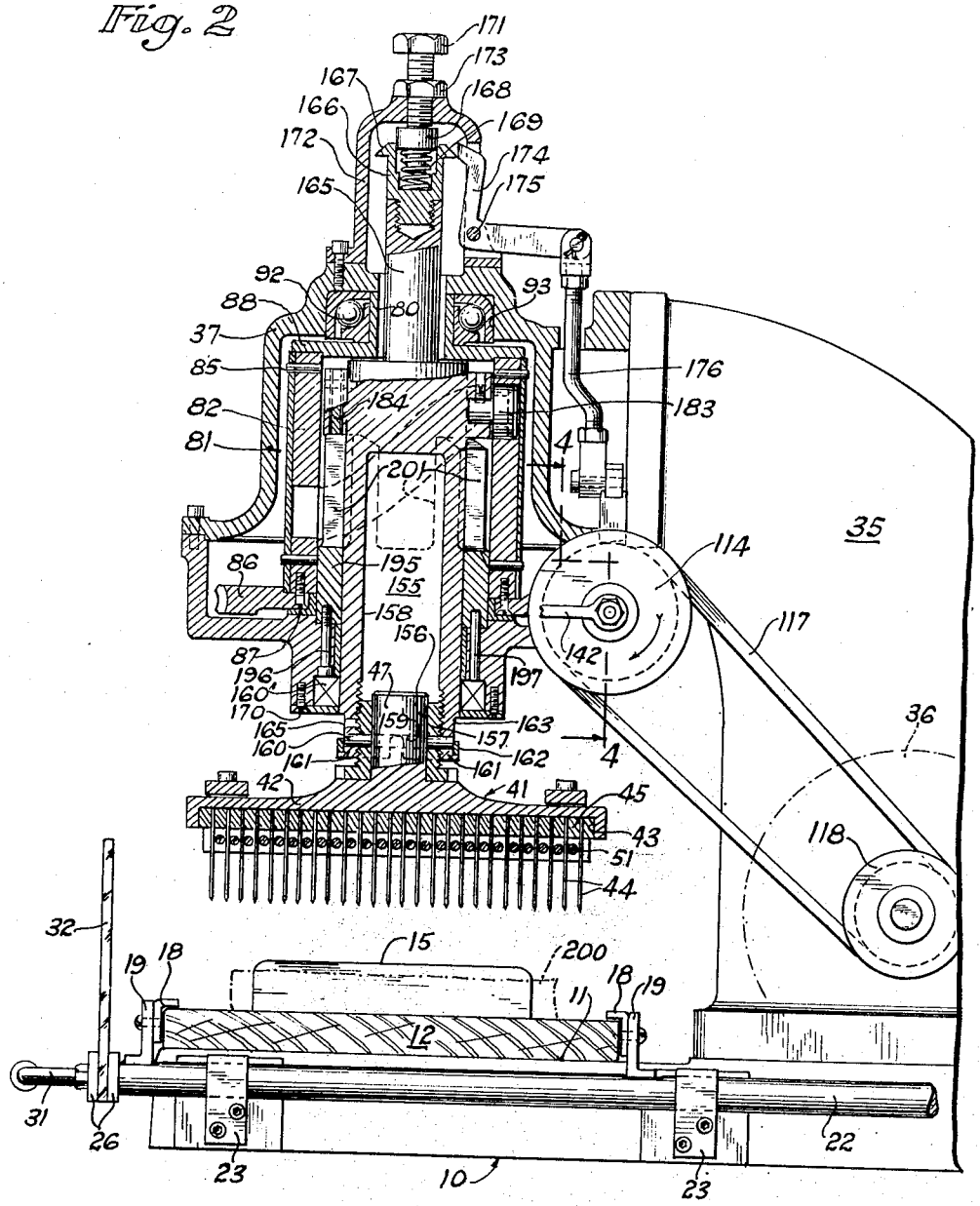

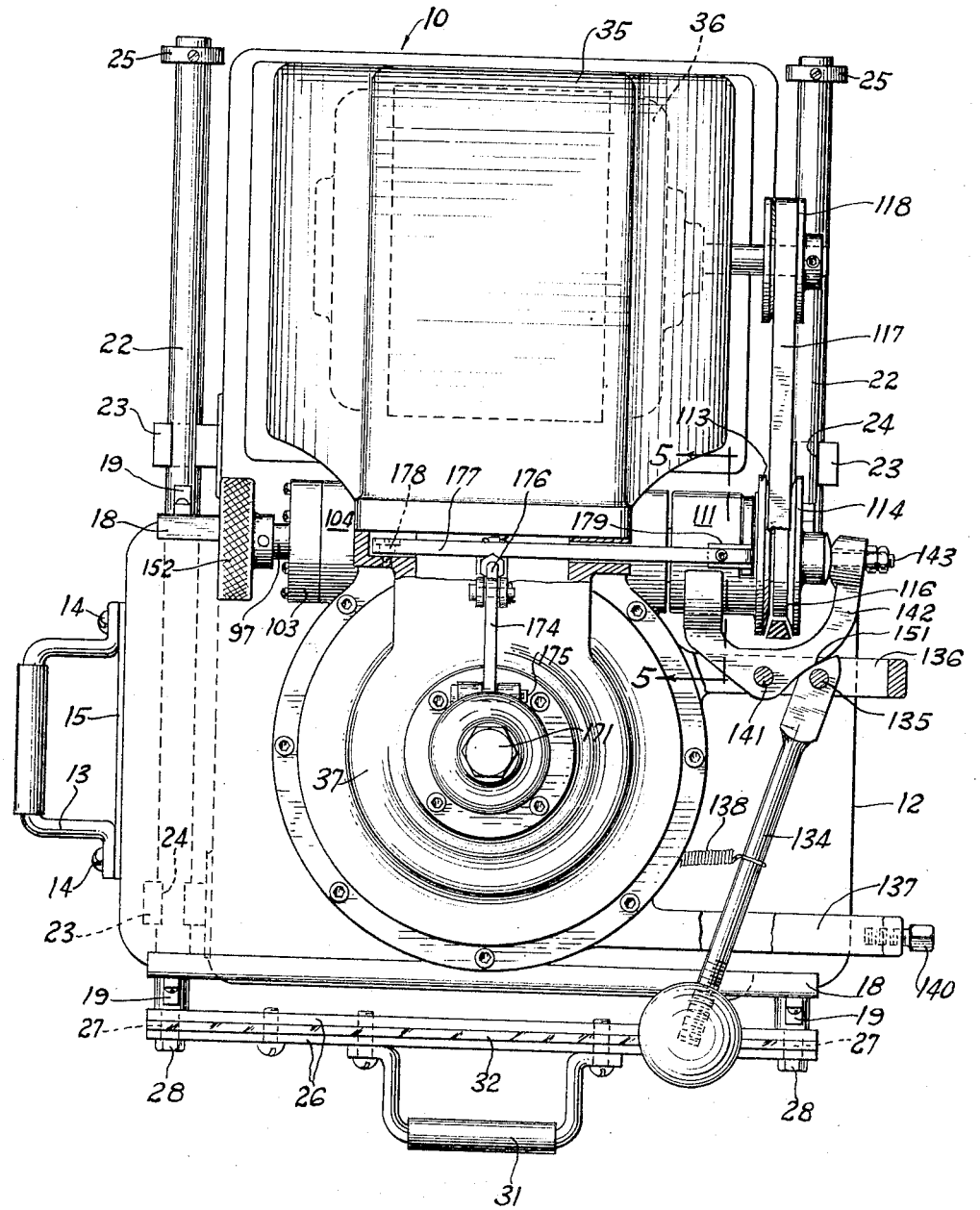

INVENTOR.
Scott M. Abbott
BY
Thiess Olson & Mecklenburger
Attys

Patented July 3, 1951

2,559,270

UNITED STATES PATENT OFFICE 2,559,270

MEAT-TENDERING MACHINE

Scott M. Abbott, Chicago, Ill., assignor to Tenderet Corp., Chicago, Ill., a corporation of Illinois Application March 31, 1947, Serial No. 738,377

8 Claims. (Cl. 17—25)

This invention relates to a meat-tenderizing machine. More specifically, it relates to a machine including a multiplicity of knives movable into cutting position for severing the fibers of a fillet of meat in order that the same may be more readily cooked, and the so-called utility grades of meat made more easily masticated.

Manually operated machines of the class pointed out are well-known. One such type is shown and described in United States Letters Patent No. 2,061,799, granted to John C. Hintz on November 24, 1936. The present invention constitutes basic improvements on the type of machine disclosed in that patent to render the same more productive, of greater flexibility in the kind of product available therefrom, and distinctly safer for the operator.

The machine of the patent referred to, as well as the commercial form of machine developed substantially in accordance with the specification thereof, is for manual operation, and requires considerable effort since the operator must not only apply sufficient force to cause the knives, of which there are a large number, to penetrate the meat, but additional force to overcome the spring utilized to restore the cutting head to inactive position following the working downstroke. Obviously, when processing a large number of pieces, a power-actuated device is far more to be preferred than one dependent upon manual operation.

Accordingly, a principal object of my invention is to provide a meat-tenderizing machine which shall be power-driven and automatic in operation.

Another object is to provide a machine of the type referred to and in which a plurality of parallelly disposed cutting knives are supported in a so-called cutting head for rotation as a group to successive positions for succeeding series of cuts at an angle to the first, and which machine shall include means for causing automatic indexing of the cutting head to the successive cutting positions.

Still a further object is to provide an automatic machine as noted in the preceding paragraph in which the indexing operation occurs in uniform angular increments independently of conscious action on the part of the operator.

Another aim is to provide an automatic machine of the type referred to in which the reciprocating means causing upward and downward movement of the cutting head is so interrelated with the indexing means as to insure that indexing will occur on each reciprocation, and only after the knives have been withdrawn from the meat following a cutting stroke.

An additional object is the provision of a machine as referred to in which the cutting head is rapidly interchangeable with a die for forming a mass of comminuted meat into a patty, as for Hamburg steak.

A further object is to provide means for detachably securing the cutting head or the patty-die to the reciprocating part of the machine, which means shall be proof against accidental disengagement, and include an adjusting device for determining the relation between the sharp edges of the knives and the meat-supporting surface to prevent penetration of the surface by the knives, or the relation between the face of the patty-die and said surface whereby different thicknesses of patties may be formed at will.

Still a further object is to provide improved trouble-free means in conjunction with the cutting head for stripping from the knives the meat impaled thereon.

Another object is to provide a machine having safeguards of novel form to prevent injury to the operator.

A further object is the provision of means for automatically feeding portions of meat to the machine for processing thereby, and for removing the processed portions.

Other objects will appear as the description proceeds.

In the drawings which show certain forms in which the invention may be embodied in practice:

Fig. 1 shows a front elevational view of the machine;

Fig. 2 shows a combined elevational view and cross section as seen from the right-hand side of the machine;

Fig. 3 shows a plan view of the machine, parts thereof being in cross section;

Fig. 4 is a cross-sectional detail of the clutch taken on the line 4—4 of Fig. 2;

Fig. 5 is a cross section taken on the line 5—5 of Fig. 3 to show the brake;

Fig. 6 is a cross section taken on the line 6—6 of Fig. 4 to show the clutch-releasing means;

Fig. 7 is a detail view in exploded perspective to show the ram, box cam and channel cam;

Fig. 8 is a detail view looking in the direction of the arrows 8—8 of Fig. 7;

Fig. 9 is a detail view showing the interrelation of the box cam and ram;

Fig. 10 is a detail view to show the relation of the ram catch and box cam;

Fig. 11 is a detail view showing the relationship of the channel cam to its follower in one position thereof;

Fig. 12 is a transverse cross-sectional view of the cutting head;

Fig. 13 is a partial plan view of the cutting head;

Fig. 14 is a partial side elevational view taken in the direction of the arrows 14—14 of Fig. 13;

Fig. 15 is a detail view taken in the direction of the arrows 15—15 of Fig. 12;

Fig. 16 is a perspective detail of the patty-die, and

Figure 17:
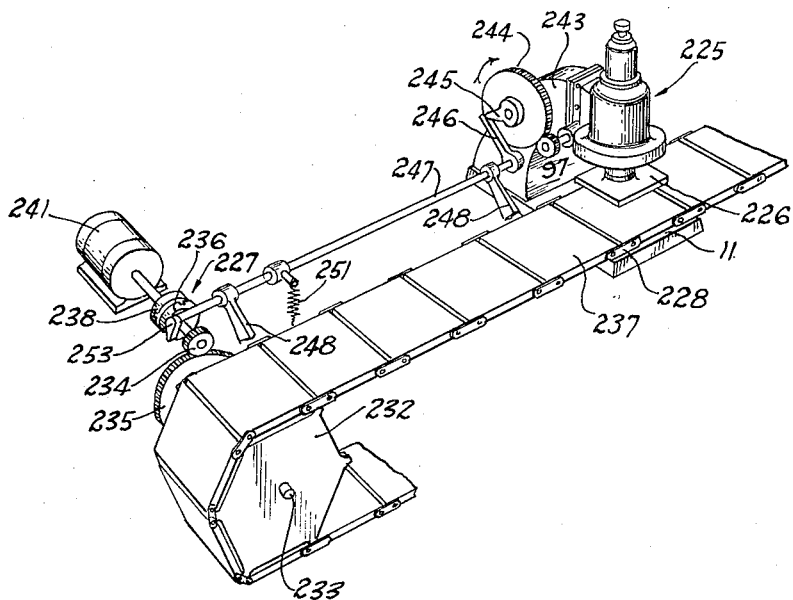
Fig. 17 is a perspective view to show a modified form of the invention.

The tendering operation, as commonly practiced, comprises a penetration of the fillet of meat, e. g., a steak, by a plurality of relatively short, closely spaced, staggered knives in two directions at right angles to each other, viz., a series of short, aligned cuts criss-crossed with a second series of such cuts to insure that all fibers, regardless of their direction, are severed into a multiplicity of very short lengths, and the fillet thus prepared for more thorough cooking and easier mastication.

Upon penetration of the meat by the knives and return movement of the cutting head, the fillet will cling to the knives and must be stripped therefrom. To permit the employment of a reliable, effective stripping means, e. g., that disclosed in the Hintz patent heretofore referred to, the knives are formed out of parallel strips of metal, each strip being interrupted at equally spaced intervals along an edge to provide the short knives alluded to, these perforce being sharpened. Accordingly, to produce the two intersecting series of cuts, the head is rotated 90° after each stroke. In accordance with the instant invention, such rotation is effected automatically following the stripping of the meat from the knives, the indexing of the head for each 90° of rotation being directly under the control of the means which reciprocates the cutting head. Usually two cutting strokes, with indexing in between, are allowed for each piece of meat processed, although the meat may be operated upon as many times as desired.

Referring now particularly to Figs. 1, 2 and 3, the preferred form of machine there shown comprises a heavy base casting 10 including a front flat platform or table 11 upon which the meat-supporting board 12 may slidably rest. The latter is preferably a piece of hardwood or a metal frame with a sheet of rubber inserted therein, not only to present a surface incapable of dulling the knives but easily cleaned. For manipulating the board 12 transversely of the machine from left to right, the board is provided with a handle 13 secured by screws 14 which also retain a flat metal guard 15 to insure against the operator's fingers which are holding the handle 13 from accidentally being under the knives. To guide the board 12 in its transverse path fore and aft, there is provided a pair of inverted L-shaped rails 18—18 supported by brackets 19 in turn carried on rods 22—22. Rods 22—22 are slidably supported in apertured brackets 23 affixed to the base 10 whereby the board 12 may, cojointly with its manipulation from right to left or vice versa, be moved from front to rear and vice versa. In that manner every part of a fillet extending beyond the range of the cutting head may be brought into the zone of operation of the knives. Brackets 23 have slots 24 to permit the brackets 19 to clear upon movement of the rods 22, and the latter have set collars 25 secured to the end thereof to limit forward movement thereof. To unite the rods 22 for joint movement a pair of suitably apertured bars 26—26 are fitted over reduced sections 27—27 of the rods, and nuts 28—28 utilized to complete the fastening. A handle 31 and preferably transparent front guard 32 complete the assembly, the handle and guard serving the same kind of functions as the corresponding elements forming parts of the board 12.

Bolted to the rear part of the base 10 is the standard 35 of rigid box-like construction and having the electric motor 36 therewithin. Affixed to the upper part of the standard is the generally cylindrical housing 37 containing some of the principal elements of the mechanism shortly to be detailed.

The cutting head 41 (Figs. 12 through 15) is, in certain respects, the same as that described in the aforementioned Hintz patent and also in United States Letters Patent No. 2,293,094 granted to Scott M. Abbott on August 18, 1942. Briefly, the head comprises a support casting 42 having a recess 43 into which the knife strips 44 are secured by embedment in a matrix 45. The knives 46 proper are formed by notching the strips 44 (as shown best in Fig. 12), the relatively short sharp edges and their staggered disposition being capable of severing the meat fibers in the desired manner while retaining enough of its integrity to permit the piece to be handled during sale, cooking and serving. For securing the head 41 in operative relation with the ram to be described the support 42 is provided with an integral shank 47 having a diametrically disposed aperture 48 for a purpose to be described.

One of the important features of my invention resides in improved means for stripping the meat from the knives after each cutting stroke. Such means includes the two sets of interdigitated rods 51, each rod being normally positioned intermediate a pair of strips 44, and operable in a swinging movement therebetween and thereoutof to dotted line position (Fig. 12) to strip the meat from the knives 46. Each set of rods 51 is secured in an individual bar 52 in turn fastened by a bolt 53 and nut 54 to a bail 55, the latter being pivotally supported on ears 56 of the support 42 by means of spring-pressed pivots 57 of a common type. Each bail 55 includes an integral centrally-located arm 61 having a notch 62 adapted to be engaged by a latch 63 pivoted at 64 to a finger 65. The latter is in turn pivoted at 66 on integral projections 67 of the support 42, and a coiled torsion spring 71 constantly urges the latch 63 into engagement with the arm 61.

In order to provide tension on the bails 55 for returning the stripper rods 51 to normal following the stripping step, each bail includes a pair of lugs 72 each of which is adapted to engage one end of a leaf spring 73 extending from one lug 72 to its opposite, and backed up by a pair of second leaf springs 74, the springs 73 and 74 being clamped to the support 42 by a plate 75 and screws 76. From Fig. 12 it will be clear that springs 73 and 74 constantly bear on the lugs 72 to rotate the bails 55 to a position wherein the rods 51 are concealed between the strips 44 and above the effective cutting depth of the knives 46. The stripping operation per se will be described later.

Arranged for rotation within the housing 37 is the channel cam 81 (Figs. 1 and 7) comprised of an inner shell 82, the upper and lower parts of which define a channel 83, and there is provided an outer continuous shell 84 to support the two parts comprising the shell 82. Dowels 85 and rivets (not shown) serve to fasten together the several parts just detailed. Secured to the lower face of the cam 81 is an annular worm gear 86 bearing on a bronze collar 87; and pinned to the upper end of the cam is a cap 88 including a flange 89 upon which the inner race of a ball bearing 92 is press-fitted, the other race being pressed into a cavity 93 of the housing 37.

Worm gear 86 is in mesh with a worm 95 (Fig. 4) pinned at 96 to the shaft 97 supported for rotation on radial ball bearings 98 at each end (one only being shown in Fig. 4). A thrust ball bearing 101 and oil seal 102 are provided at the drive end of the shaft 97 for familiar reasons, the other end of the shaft being similar except for the absence of the thrust bearing. A cap 103 is provided (Fig. 3) to enclose the left-hand end of the worm housing portion 104.

Rotation is imparted to the shaft 97 through a clutch (Figs. 4, 5 and 6) comprising a body portion 111 pinned at 112 to the shaft and including a sheave half 113, the other half 114 being part of a shell-like member 115 freely revoluble on the right-hand end of the shaft 97. A free annular disc 116 is positioned intermediate the sheave halves 113 and 114 and in the idling condition of the machine supports the V-belt 117 interconnecting the clutch to the drive pulley 118 of the motor 36. An arcuate latch 121 (Fig. 6) is positioned within a slot 122 in the body portion 111 and is pivoted thereto at 123. An adjustable spring-pressed plunger 124 lying in a recess 125 constantly urges the latch 121 in a clockwise sense, as seen in Fig. 6.

The latch 121 includes an arcuate inner recess to define with that end thereof opposite the plunger 124 a blade 131 having a flat left-hand face adapted to lock over the right-hand face of the generally frusto-conical annular member 132 slidable on the shaft 97 and urged to the right by a compression spring 133 lying within the clutch body 111. Member 132 abuts the sheave half 114 as shown.

For actuating the clutch there is provided a laterally swingable handle 134 (Fig. 3) pivoted at 135 within a V-shaped strap 136 forming part of the housing 37, the forward end of the handle being supported and guided in a similar strap 137. A coiled tension spring 138 interconnecting the housing 37 and handle 134 biases the same to the left of "off" position, maximum movement to the right or "on" position being limited by stop screw 140. Also pivoted as at 141 to the strap 136 is the yoke 142 having one end thereof apertured and fitting loosely over a stud 143 extending outwardly from the sheave half 114. A nut 144 and locknut 145 are provided for familiar reasons. At its opposite side, the yoke 142 is arcuately bifurcated as at 146 (Fig. 5) and faced with a leather brake shoe 147 to conform to the curvature of the clutch body 111. The rearward terminus of the handle 134 has a cam face 151 adapted to rock the yoke 142.

For the purpose of making adjustments in the mechanism, shaft 97 may be provided with a knurled handle 152 pinned thereto, and by which means the shaft may be rotated manually.

Cutting head 41 is supported for reciprocation and rotation upon the generally cylindrical ram 155 (Fig. 2) having a hollow interior 158 for lightness. Shank 47 fits within an aperture 156 of the sleeve 157 threadedly engaged with the aperture 158 of the ram 155. These threads are of rather fine pitch to permit close adjustment of the sharp edges of the knives 46 (or of the flat lower face of the patty head to be described) with reference to the upper surface of the board 12. Shank 47 has a diametrical hole 159 engaged by a loose pin 160 also passing through one or the other of the diametrically disposed pairs of U-shaped slots 161 in the lower end of the ram 155. A retaining ring 162 slidable axially in a peripheral recess 163 in the ram 155 locks pin 160 against dislodgment. A headless set screw 164 serves to lock the sleeve 147 in any position to which it may be rotated for adjustment thereof. At its upper end the ram is reduced in diameter to form an extension 165 having the head 166 threadedly engaged therewith, the head terminating in a frusto-conical cap or cam 167. The latter is made separable from the extension 165 only for convenience of assembly. A plunger 168 urged by a spring 169 bears against a screw 171 threaded into the housing 172 secured to the top of the housing 37. Lock nut 173 has an obvious function. The lower end of the ram is sealed with respect to the housing 37 by an oil seal 160' retained by a plate 170, all as is understood in the art.

Cam 167 is adapted to actuate one leg of a bell crank 174 pivoted at 175 to the housing 172, the other leg being connected by a link 176 to a lever 177 pivoted at 178 to the housing 37. The free or right-hand end of the lever 177 carries a dog or nose 179 adapted to cooperate with the latch 121 of the clutch (Fig. 6). A compression spring 180 (Fig. 4) urges the lever 177 constantly counter-clockwise.

Ram 155 (best seen in Fig. 7) includes two integral radial projections 181 and 182, the latter having a cam-follower roller 183 pivoted thereon and adapted to cooperate with the channel 83. Projection 181 not only participates in the reciprocatory and indexing movements of the cutting head 41, but supports a swinging latch 184 (Fig. 10) pivoted at 185 and normally urged outwardly of the projection by a spring 186. An arcuate slot 187 cooperating with a fixed pin 188 limits outward movement of the latch 184.

The channel 83 of the cam 81 comprises a simple rise and fall, the rise being detailed in Fig. 11 and including a shoulder 191 conforming substantially with the curvature of the roller 183, and for a purpose to be described. It is to be noted that Fig. 11 represents the channel cam 81 viewed from its interior.

Surrounding the ram 155 and within the channel cam 81 is the fixed box cam 195 (Figs. 2, 7 and 8) secured by screws 196 and dowels 197 to the lower part of the housing 37. Cam 195 is substantially a hollow cylinder and is provided with axially extending slots 201, in this case four in number but not limited thereto. Slots 201 are straight-sided as shown to receive with a smooth, sliding engagement either of the projections 181 or 182. The entrance of each slot is beveled at one side to provide the plurality of surfaces 202 (Figs. 7 and 10).

*Operation*

As heretofore pointed out, the boned-out piece, or pieces, of meat, i. e., fillets, are deposited on the board 12 while it lies in operative position as shown, or the board may be withdrawn from its guides, loaded, and then placed in position for the tendering operation. It is not essential that the fillets be disposed in any particular orientation since, as will appear, any part of the board may be readily brought into position under the zone of action of the knives. Assuming that the fillet 200 indicated in dot-and-dash lines in Fig. 2 has been processed, a succeeding piece may be brought into operative position by combined right-and-left and rearward-and-forward movements imparted to the board 12. That is to say, it is unnecessary that the operator actually pick up the pieces of meat and thereby place his hands within the cutting zone. In fact this safeguard constitutes a salient feature of the invention in that prior devices were not provided with means for manipulating the meat from points disposed safely outside the zone of operation to insure safety to the operator in the event of unintended movement of the cutting head.

Board 12 is slidable right and left between the rails 18 and surface 11; and is movable fore and aft upon the rods 22. Accordingly, not only may a fillet of a size lying within the area of the knives 46 be positioned therein, but should the fillet be of a size incapable of being completed on two intersecting series of cuts, the board 12 may be manipulated as aforesaid to bring all of the fillet within the cutting zone. As pointed out, guards 15 and 32 are effective to prevent any accidental movement of the operator's fingers to within the cutting zone.

The meat now being generally within the cutting zone, or manipulatable thereinto as aforesaid, operation of the machine may be initiated. In order further to insure against the operator's right hand being within the range of the knives, the clutch heretofore detailed is of the type disengageable automatically after a single revolution or number thereof, viz., the clutch must be engaged by a conscious movement of the operator, and providing the clutch handle is released, the clutch will disengage after having made that number of revolutions corresponding to one revolution of the cam 81 in the manner to be described. The speed of the motor 36, the ratio between the worm 95 and gear 86 and the ratio between the driving and driven sheaves are unimportant just so long as these are within the limits of good design. At the termination of one complete reciprocation of the head 41, and provided handle 134 is released, the head stops at the top of the upstroke. However, if the clutch handle is held to "on" position, the head continues through its reciprocations. One "cycle" of the unit as hereinafter referred to will mean one downstroke and one upstroke, i. e., one complete reciprocation of the cutting head, while "indexing" of the head about the axis of the cam 81 will refer to rotation of the head by increments of 90°.

With the motor 36 running and the clutch disengaged, the belt 117 will merely rotate the idling ring 116. However, swinging of the handle 134 to the right cams the yoke 142 in a counter-clockwise sense (Fig. 3) whereupon sheave half 114 and ring 116 are slid upon the shaft 97 to pinch the belt 117 between said half and the other half 113. Simultaneously the member 132 is locked to the left by engagement of its right-hand face against the left-hand face of the latch 121 which is at this time in the full line position (Fig. 6). Consequently the belt may rotate the entire clutch and with it the shaft 97, worm 95 and worm gear 86, and such rotation will continue so long as the handle 134 is held "on," or, if the handle is released immediately the clutch will rotate until the ram has made one complete reciprocation in the manner to be hereinafter detailed.

Rotation of gear 86 carries with it the cam 81, which latter will then actuate roller 183 to move the ram 155 through a complete reciprocation during every revolution of the cam. In order to impart indexing movement to the ram the arcuate shoulder 191 abuts the periphery of the roller 183 and thus carries the ram with it. Assuming the parts to be in the relative position shown in Fig. 7 with the projections 181 and 182 resting on the top edge of the box cam 195 channel cam 81 and ram 155 will rotate together a small angular distance until the trailing edge of the projection 181 encounters a bevel surface 202 whereupon the ram will begin to descend the incline 202. Due to the weight of the ram and of the cutting head 41, the projection 181 will finally enter the slot 201, and is positively moved downwardly into the slot by the channel cam 83, because, by the time the leading edge of the projection 181 encounters the left-hand edge of the slot 201 (Fig. 10) the roller 183 has moved downwardly with the ram away from the shoulder 191, and the channel cam "rise and fall" portion may become effective. In this connection the clearance between the roller 183 and the lower edge of the channel 83 will be noted (Fig. 11).

Upon upstroke of the ram by virtue of channel 83 there is a tendency, under certain conditions arising principally out of momentum of the parts, for the projection 181 to return immediately to the same slot 201 from which it has just risen. To avoid such accidental occurrence, I provide the latch 184 heretofore detailed. Upon approach of the projection 181 to the left-hand edge of a slot 201, the latch 184 is thrust to a position within the projection against the spring 186 and the ram may descend. However, upon upstroke thereof the spring 186 opens the latch which may then engage over the upper periphery of the box cam 195 to prevent accidental descent of the ram (Fig. 10, dotted line position). Succeeding strokes of the ram are identical with the one just described, each of the four slots 201 permitting four independent reciprocations of the ram. It will now be apparent that the cam 195 may have more or less than four slots 201.

Each stroke of the cutting head 41 causes the knives 46 to penetrate the piece of meat 200 and thus to sever the fibers as is understood in this art, the following stroke of the head, being in the instant example, displaced 90° angularly, causing the knives to cut the meat in a direction at right angles to the first. By means of succeeding strokes spaced 90° angularly apart thorough processing of the meat is assured. Furthermore by shifting the board 12 between strokes every part of the fillet may be effectively operated upon.

While the knives 46 are closely spaced endwise as well as parallelly, and while the cutting head moreover indexes between strokes, it may be desirable in some instances to shift the board 12 to make additional cuts intermediate the preceding ones, and the means provided therefor and already described offer a safe, simple way of reaching this end. By providing a flat-bottomed pan in lieu of the board 12 and fixing its periphery to correspond with the arc of swing of that corner of the head 41 most distant from the axis thereof the machine could be effectively employed for mincing.

In order to prevent rebound of the ram as it cooperates with the box cam and channel cam the spring 169 acting in cooperation with the plunger 168 exerts the required counteracting pressure. Adjustment of the spring tension is effected by screw 171. By providing plunger 168 against the spring the ram 155 is free to rotate without subjecting the spring to torsional stresses.

As heretofore pointed out, the clutch will remain engaged as long as handle 134 is held to the right. However, upon release of this handle it is important that the clutch be disengaged automatically when the cutting head 41 is at the top of the upstroke then being performed. To this end the head 167 will, upon movement of the ram 155 to uppermost position, actuate bell crank 174 and hence link 176 and lever 177 (Fig. 1) to carry the dog 179 into the path of the clutch latch 121 (Fig. 6). Accordingly, when the normally protruding tail of the latch strikes the dog 179, the latch is rocked counter-clockwise from the dotted line position shown in Fig. 6, to release the blade 131 from latching relation with the member 132 (Fig. 4), whereupon spring 133 is effective to force the member and sheave half 114 to the right. Belt 117 again runs idle and the mechanism comes to rest. To compensate for overtravel of the clutch due to momentum, release of the handle 134 allows the brake shoe 147 (Fig. 5) to contact the clutch body 111, braking pressure being applied through spring 133.

Reverting to Figs. 1, 2 and 12, the stripper rods 56 are adapted to be actuated upon the upstroke of the cutting head 41. Thus, normally the latches 63 are engaged in their respective notches 62 and fingers 65 are inclined inwardly and upwardly. As the head moves to its uppermost or rest position, the fingers 65 are caused to strike the plate 170 and thus depressed, whereupon latches 63 rotate the bails 52 about their pivots 57 to swing the two sets of rods 51 outwardly of the knives 46 to strip the meat therefrom. In order that the rods 51 make rapid return, i. e. "snapped," to concealed (full line) position, the latches 63 are adapted, upon full depression of the fingers 65, to release from the notches 62 (see dot-and-dash showing of Fig. 12), whereupon springs 73 and 74 in cooperation with the lugs 72 return the rods to concealed position with a trigger motion. By so doing no interference with the cutting function can result, as might otherwise be the case if return of the rods 51 were effected positively rather than trip-actuated. It will be understood that the device of the instant invention is designed for high-speed operation, and it is therefore important that stripping of the meat and return of the stripping rods to normal be accomplished as rapidly as possible.

It is desirable to be able to adjust the relationship of the sharp edges of the knives 46 with reference to the top surface of the board 12. Such adjustment must be capable of being effected by small increments since it is desirable for the knives to cut entirely through the meat but not to penetrate the board. The latter situation, if allowed to continue, would eventually so macerate the board as to give rise to splinters and consequent danger of contaminating the meat placed thereon. I provide such preferred minute adjustment by means of the sleeve 147 and pin 160 (Fig. 2), viz. by lifting the ring 162 upwardly the pin may be pushed out of the pair of slots 161 and aperture 159, and the head 41 thereby removed. Then by rotating the sleeve 157 upon its threads the same may be raised upwardly or downwardly and the pin 160 reinserted. By providing two sets of slots 161, there will be at least one set close to the desired position, and, since the pitch of the threads of the sleeve is small, say 24 threads per inch, extremely fine adjustments may be effected. After reinsertion of the pin the ring 162 is dropped thereover to prevent accidental dislodgment thereof. The set screw 165 is provided to maintain the sleeve 157 in its desired position in order that the head 41 when removed for daily cleaning or servicing may be replaced without disturbing the position of the sleeve, the pin 160 permitting rapid detachment and attachment of the head 41. The lower flange of the sleeve 157 may be provided with peripheral notches for a spanner or hook wrench.

The invention is not limited in its use to tendering of steaks, cutlets and other fillets, but is capable of forming hashed or minced meat into patties and "Frenching," the latter being the flattening of certain cuts, e. g., pork or beef tenderloin slices to render them of larger area for ease in cooking. For these and other purposes, I provide a die 210 (Fig. 16) preferably of circular form and flat-bottomed, there being an integral shank or post 211 corresponding to the post 47 of the cutting head 41 and engageable similarly with the sleeve 157. However, the indexing movement of the ram 155 is without significance in the present instance since only the reciprocatory stroke is needed. Nonetheless no interference with the patty forming or "Frenching" operations will be encountered by reason of such indexing.

Of particular importance is the improved tensioning means for the return of the stripper rods 51 and their retention in normal or concealed position within the spaces between the knives 46. It is to be noted that the leaf springs 73 and 74 not only act in conjunction with the lugs 72 to return the rods, but due to the over-center action of the springs in relation to the pivots 57 the rods are effectively retained in normal position. Prior means intended to perform these same functions and taking the form of coil springs have proved unreliable and short-lived. The construction and arrangement of springs herein disclosed is positive, and practically indestructible.

In Fig. 17, I have shown somewhat schematically a further embodiment of the invention in which the machine is adapted for continuous operation. As there shown, the tenderizing machine 225 is substantially as heretofore described except for certain modifications to be hereinafter pointed out. In this embodiment, the board 12 and the guiding means therefor are dispensed with, and in lieu thereof the fillets of meat are individually supported on wood or equivalent panels 227 united into a conveyor belt by links 228, the panels being adapted for sliding movement across the surface 11. The machine may be mounted on a suitable table, for example, one having a flat top with a depression therein to receive the base of the machine, and the depression being of such depth as to align the surface 11 with the surface of the table. Accordingly, the several panels 227 are supported for sliding movement on the surface of the table.

Panels 227 are united, as stated, in the form of a continuous belt, the end loops whereof carried on suitable pairs of sprockets 232 supported for rotation on a shaft 233, only one sprocket of a pair and one shaft being visible in the figure. It will be understood that the shafts 233 are carried in suitable bearings.

Rotation is imparted to the sprockets 232 by a pinion and gear 234 and 235 respectively. Pinion 234 is driven through one half 236 of a clutch 237, the other half 238 thereof being keyed to the shaft of the motor 241. Clutch 237 may be of any type, for example, including a friction disc, jaws or any other type of engagement found suitable for the intended purpose.

Assuming that the fillets of meat, each of which is supported on a panel 227, are to be brought singly and successively within the working zone of the head 226 and that each is to be subjected to two cutting strokes, the conveyor belt must be stepped along the distance of one panel 227 for two strokes of the head. Inasmuch as the speed ratio of the shaft 97 and of the channel cam causing actuation of the head 226 may vary as heretofore explained, and in any event the shaft 97 preferably makes several revolutions for each such stroke, I prefer to interconnect or synchronize the strokes of the head 226 with the step-by-step movement of the conveyor belt by means of the character shown. That is to say, a pinion 243 may be connected to the shaft 97 in lieu of the handle 152, and such pinion is adapted to drive a gear 244 supported for rotation in any suitable manner on the frame of the machine 225. A cam 245 is affixed to the gear 244 and is adapted to rock an arm 246 attached to one end of the shaft 247, the latter being supported in fixed bearings 248. A tension spring 251 provides the necessary force to maintain the arm 246 in contact with the cam 245. To that end of the shaft 247 adjacent the clutch 237 there is affixed a fork or equivalent clutch operating means 253.

Accordingly, by proper selection of the ratio between the pinion 243 and gear 244, the fork 253 is caused to engage and disengage the clutch 237 once for every two strokes of the cutting head 226. Therefore, assuming a piece of meat to be in position on its panel 227 and underneath the head 226, the first stroke thereof will provide a series of cuts in one direction of the meat and the succeeding stroke a series of cuts at an angle of 90° thereto. Meanwhile, the cam 245 is rotating and will, upon the completion of the last cutting stroke, and following the stripping of the meat from the knives as heretofore explained, actuate the clutch 237 to carry the next piece of meat into position under the cutting head. Operation of the machine 225 is generally as heretofore described, including the use of the clutch handle 134 to stop and start the machine. The processed meat may be removed from the panel 227 by an operator or merely delivered therefrom onto a fixed table or second conveyor. The operator may load the meat on the panels 227 by using her left hand, while operating the handle 134 with her right.

It will be obvious that alternative arrangements may be used to convert the machine of the instant invention to continuous operation, that shown in Fig. 17 being only one preferred form. For example, a solenoid-controlled clutch 237 may be used, the necessary circuit closing impulses being through contacts operated by a cam on the gear 244. The fundamental requisite in the modified form shown in Fig. 17 is the means for synchronizing the strokes of the machine with the intermittent movement of the belt carrying the pieces of meat under the cutting head.

Whether the unit is of the principal form first described herein or the alternative arrangement shown in Fig. 17, I may arrange to dispense with the indexing movement of the cutting head and in lieu thereof provide mechanism for indexing the table that supports the pieces of meat. In any event, it is intended that the reciprocation of the cutting head and the relative rotation of the meat and cutting head be synchronized in order that such rotation will occur after the meat has been stripped from the cutting knives, and prior to the time the head has descended to the point where the next cut begins.

The machine is not limited in its application to the tenderizing of fillets of meat, patty forming, "Frenching," mincing or other operations upon meat products but may be utilized, for example, in the mincing of vegetables. Moreover, it is within the contemplation of the invention to substitute for the cutting head shown and described, one equipped with a honeycomb arrangement of knives for cubing food products, for example, carrots, and then by utilizing stripping means in the form of plungers individual to and within each cell of the honeycomb, to strip from the knives any of the diced products which may cling thereto.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A machine of the class described comprising a head including bladed means for operating on a product, a ram for supporting said head, means associated with said ram for reciprocating said ram and for indexing said ram through predetermined angular increments including a follower carried by said ram and a cam in operative relation with said follower, a hollow cylindrical second cam surrounding the ram, a second follower carried by said ram, and said second cam having a plurality of axially-disposed slots operatively engageable by said second follower, said first mentioned cam including an actuating portion for indexing said ram and a portion for reciprocating said ram, said slots being adapted to determine the extent of each indexing movement of said first-mentioned cam.

2. A machine of the class described comprising a head including bladed means for operating on a product, a reciprocable and rotatable member for supporting said head, means associated with said member for effecting reciprocation of said member including a cam having a simple rise and fall cam surface and a follower engageable therewith and carried by said member, said cam also including a shoulder forming part of said surface adapted to engage said follower to impart rotation to said member, and means associated with said member for determining the angular extent of such rotation.

3. A machine as in claim 2 in which said rotation-limiting means includes a fixed box-cam having a plurality of slots therein and said member includes a portion adapted to enter a slot upon rotary movement of said member.

4. A machine as in claim 3 in which said box-cam is of hollow cylindrical form and the slots are provided in the wall thereof, and each said slot is beveled at that side thereof whereat the said portion is adapted to enter to facilitate such entry.

5. A machine of the class described comprising a head including bladed means for operating on a product, a reciprocable and rotatable member for supporting said head, means associated with said member for effecting reciprocation of said member, and means associated with said member for rotatably indexing said member including an element having a plurality of slots therein disposed parallel to the axis of reciprocation, said member having a portion selectively engageable in any of said slots, a latch associated with said portion and adapted to move to inactive position when said portion enters a slot upon reciprocation of said member in one sense and movable to active position when said portion has withdrawn from the slot upon return reciprocation of said member, the interengagement of the portion and slot indexedly positioning said member in a selected angular position.

6. In a machine of the class described for use with a frame and a base member provided with a surface to receive a product to be operated on, the combination comprising a head having bladed means for operating on the product, a member for supporting said head and carried in the frame for reciprocating movement, means associated with said member for reciprocating said member, power-driven means and clutch means operatively connected intermediate said reciprocating means and power-driven means, manually operated means associated with said clutch means for engaging said clutch means, and means operatively connected to said clutch means and actuable upon the return stroke of a reciprocation to disengage said clutch means.

7. A machine for operating upon a meat product comprising in combination a head including bladed means for operating on a product, means associated with said head for combinedly reciprocating and indexing said head, a series of interconnected product-supporting panels, means for positioning said panels singly and successively in operative relation with said head, power-driven means for said panel-positioning means, power-driven means for said head-reciprocating and indexing means, and an operative connection between said last mentioned power-driven means and said power-driven panel-positioning means including a clutch means and means associated therewith for engaging and disengaging said clutch means for intermittently driving said panel positioning means.

8. A machine of the class described comprising a head including bladed means for operating on a product, means associated with said head for supporting said head for reciprocating movement, power-driven means for reciprocating said supporting means, a member carried by said head-supporting means coactible with said power-driven means to interrupt the reciprocating movement upon the return stroke of a reciprocation, said power-driven means including a power source, a clutch, a handle for conditioning said clutch for driving, and mechanism interconnecting said head-supporting means and clutch for disengaging said clutch upon the return stroke of a reciprocation.

SCOTT M. ABBOTT.

REFERENCES CITED

The following references are of record in the file of this patent:

UNITED STATES PATENTS

| Number | Name | Date |
| --- | --- | --- |
| 2,061,799 | Hintz | Nov. 24, 1936 |
| 2,217,763 | Moldawsky | Oct. 17, 1940 |
| 2,253,123 | Hart | Aug. 19, 1941 |
| 2,293,094 | Abbott | Aug. 18, 1942 |